UNITED STATES PATENT OFFICE.

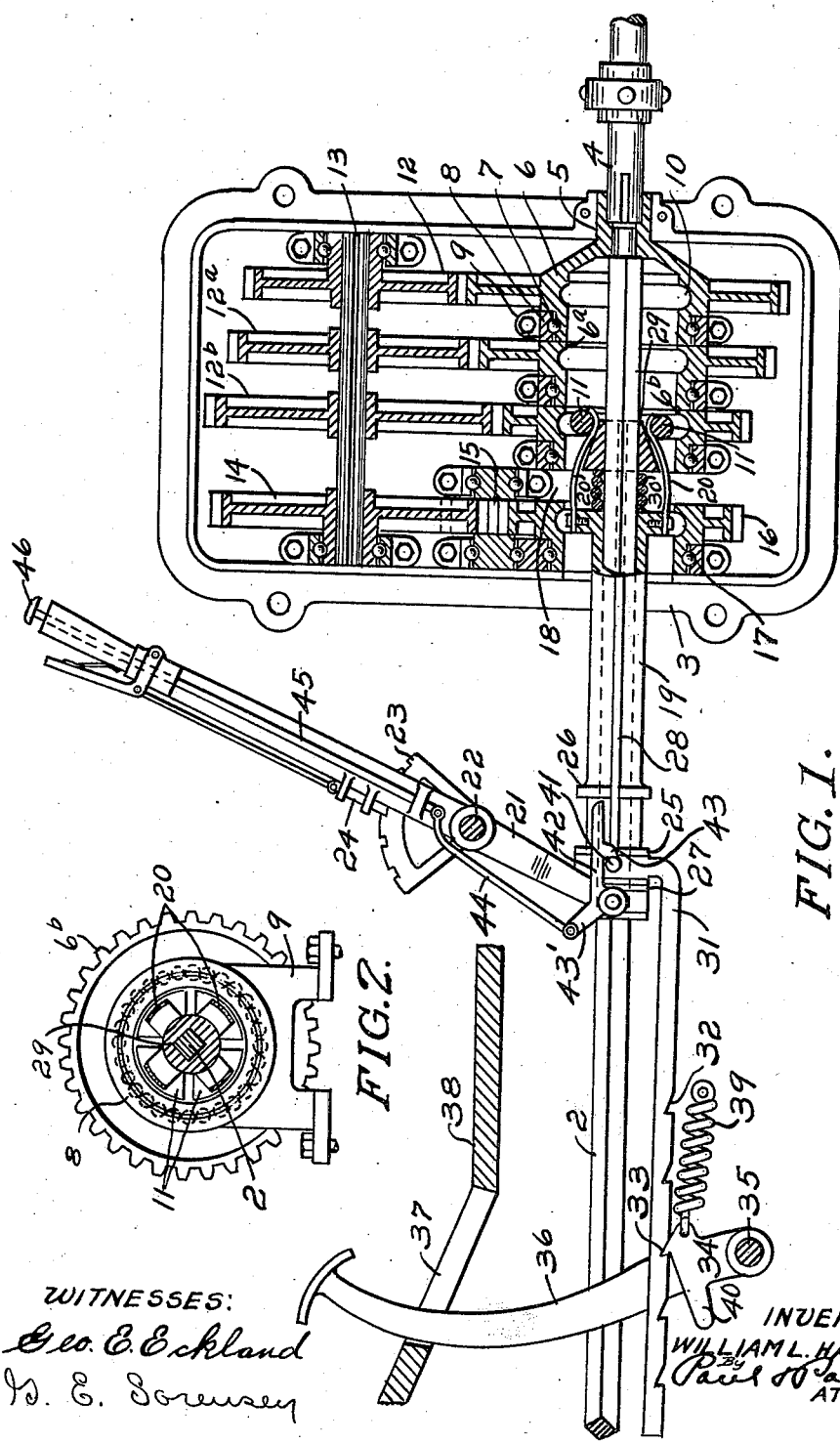

WILLIAM L. HACKNEY, OF ST. PAUL, MINNESOTA.

TRANSMISSION-GEARING.

1,044,884.

Specification of Letters Patent. Patented Nov. 19, 1912.

Application filed April 8, 1911. Serial No. 619,788.

*To all whom it may concern:*

Be it known that I, WILLIAM L. HACKNEY, of St. Paul, Ramsey county, Minnesota, have invented certain new and useful Improvements in Transmission-Gearing, of which the following is a specification.

An object of my invention is to provide a transmission gearing for self-propelled vehicles which may be shifted from one speed to another without danger of stripping the gears.

A further object is to provide a transmission gearing of simple, durable construction, having a direct and reverse connection as well as several intermediate speeds, and which will eliminate a considerable portion of the noise incidental to transmission gearing as usually constructed.

The invention consists generally in various constructions and combinations, all as hereinafter described and particularly pointed out in the claims.

In the accompanying drawings forming part of this specification, Figure 1 is a sectional view of my invention, illustrating the clutch in its released position. Fig. 2 is a transverse sectional view, showing the arrangement of the shoes of the clutch, and the anti-friction clutch ring interposed between the friction shoes and the gears.

In the drawing, 2 represents the driving shaft projecting into a transmission gearing casing 3.

4 is a driven shaft.

A hub 5 is journaled in the casing 3 and secured to the end of the shaft 4 and this hub carries a gear 6 which has ball bearings at 7 in a ring 8 that is secured to the wall of the casing by brackets 9. This gear has an internal annular seat or groove 10 for the friction shoes 11, and similar gears are provided within said casing, which I will designate by the same reference numerals with the addition of the exponents "a" and "b" These gears, 6, 6$^a$ and 6$^b$ mesh with a corresponding number of gear wheels 12, 12$^a$ and 12$^b$, mounted on a counter shaft 13 in said casing. The gears 6$^a$ and 6$^b$ have annular grooves forming seats for the friction shoes similar to the one described with reference to the gear 6 and indicated by the same reference numeral. These gears have anti-friction bearings in rings secured to the casing, corresponding to the ring 8. These rings as shown plainly in the drawings are secured to the wall of the casing and inclose the driving shaft 2 and are concentric therewith, and the gears are provided with hubs on one side having anti-friction bearings in said rings. The rings are entirely independent of one another and the gears run idle in the bearings until locked by the engagement of the clutch mechanism with the gear through which it is desired to transmit power.

A reversing gear 14 is mounted on the shaft 13 and meshes with a gear 15 having bearings on the casing, said gear 15 meshing with a similar gear 16 which has bearings 17 in the transmission casing 3. It is evident that if the shoes 11 are locked in the groove 10, that the drive will be direct from the shaft 2 to the shaft 4, and if locked in the grooves of the ring 6$^a$ and 6$^b$, the drive will be through the gears 12$^a$ and 12$^b$ and at different speeds, according to the sizes of the gears. If the shoes 11 be moved to a point where they will enter the groove in the gear 16, the drive will be through the gear 15 and the gear 14, and the direction of movement of the parts will be reversed. Between the reversing gearing and the ring 6$^b$ a recess 18 is formed, in which the friction shoes will be neutral and the parts will all be at rest. For the purpose of operating these friction shoes any suitable mechanism may be employed, but I prefer the appliance which I will now describe in detail.

19 is a sleeve slidable on the shaft 2 and carrying arms 20 which support friction shoes 11. These arms are composed of spring material and may be pressed inwardly or outwardly to set or release the shoes. The sleeve 19 is moved back and forth on the shaft to shift the shoes from one gear to another by means of an operating lever 21 pivoted at 22 and having a quadrant 23 and a locking latch 24. By releasing this latch and oscillating said lever the sleeve may be moved back and forth on the shaft 2 until the friction shoes are opposite the desired gear through which the driver wishes to direct the power from the shaft 2. A collar 25 is slidable on the sleeve 19 between stops 26 and 27 and rods 28 are attached to said collar at one end and at the other end to a cone 29 that is slidable on the shaft 2 toward the end of the sleeve 19 against the tension of a spring 30. A bar 31 is attached to the collar 25 and has a series of notches 32 therein which are engaged by a tooth 33 on an arm 34 that is mounted on a shaft 35. A foot operated lever 36 is mounted on the shaft 35 and projects up through a slot 37 in a foot-board 38. A spring 39 is attached to the arm 34 and normally holds said arm and lever 36 in their retracted position. In this position the bar 31 is held out of engagement with the tooth 33 by a lug 40 which engages the under edge of the bar. When, however, the lever 36 is thrown to the forward end of the slot 37 by the pressure of the foot, the tooth 33 will move into engagement with one of the notches in the bar 31 and slide the collar 25 on the sleeve 19 and move the cone 29 to release the friction shoes. As soon, however, as the foot is removed from the lever the spring 39 will return it to its normal position and the cone will be operated to project the friction shoes into engagement with a seat in the gear.

To lock the cone in its releasing position, as in shifting the sleeve on the shaft, I provide a pin 41 on the bar 31 and a latch 42 on the lever 21 having a lug 43 to engage said pin and an arm 43′ connected by a link 44 with an operating rod 45 that is mounted in guides in said lever and has a finger piece 46 at its upper end by means of which the operator can move the rod 45 downward, tilt the arm 43′ and the latch 42 and disengage the lug 43 from the pin 41.

To release the friction shoes, the lever 36 may be thrown to the position shown in Fig. 1, and when the latch 42 is in locking engagement with the pin 41 the cone 29 will be locked and the foot may be removed from the lever 36 and the friction shoes will remain in their release position until such time as the latch 42 is tripped by pressure of the finger piece 46.

I claim as my invention:—

1. A transmission gearing comprising a gear casing, a driving shaft projecting therein, a driven shaft, a counter shaft journaled in said casing, a series of gears of different sizes secured on said counter shaft, independent idle gears journaled in said casing and surrounding said driving shaft and having internal friction surfaces, one of said idle gears having an indirect driving connection with the opposite gear on said counter shaft, and others of said idle gears meshing with the gears of said counter shaft, a clutch slidable on said driving shaft and adapted to engage said friction surfaces and lock said gears, one at a time, on said driving shaft, a space being provided between the idle gear that is indirectly connected with said counter shaft and the other idle gears to receive said clutch when in its neutral or inoperative position.

2. A transmission gearing comprising a gear casing, a driving shaft projecting therein, a driven shaft, a hub secured to said driven shaft, a series of gears surrounding said driving shaft, one of said gears being mounted on said hub, a counter shaft, a series of gears of different sizes secured thereto, the gears surrounding said shaft having internal friction surfaces, a clutch slidable on said driving shaft and adapted to engage said friction surfaces and temporarily lock said gears on said driving shaft, the engagement of said clutch with the friction surface of the gear mounted on said hub causing the direct transmission of the power to said driven shaft, and the engagement of said clutch with the friction surfaces of the other gears causing an indirect transmission of the power through said counter shaft to said hub gear and driven shaft.

In witness whereof, I have hereunto set my hand this 28th day of March 1911.

WILLIAM L. HACKNEY.

Witnesses:
ANNA M. NELSON,
LOUIS JOHNSON.

Copies of this patent may be obtained for five cents each, by addressing the "Commissioner of Patents, Washington, D. C."